United States Patent
Toda et al.

(10) Patent No.: US 6,880,247 B2
(45) Date of Patent: Apr. 19, 2005

(54) METHOD FOR FORMING A BEARING APPARATUS

(75) Inventors: Kazutoshi Toda, Tondabaya (JP); Teruyuki Wakisaka, Kitakatsuragi-gun (JP); Kenji Takahashi, Yamatokooriyama (JP); Teruyuki Kawatani, Kitakatsuragi (JP); Shinichirou Kashiwagi, Yao (JP)

(73) Assignee: Koyo Seiko Co., Ltd., Osaka (JP)

( * ) Notice: Subject to any disclaimer, the term of this patent is extended or adjusted under 35 U.S.C. 154(b) by 18 days.

(21) Appl. No.: 10/691,786

(22) Filed: Oct. 23, 2003

(65) Prior Publication Data

US 2004/0083612 A1 May 6, 2004

Related U.S. Application Data

(62) Division of application No. 09/902,230, filed on Jul. 10, 2001, now abandoned.

(30) Foreign Application Priority Data

Jul. 17, 2000 (JP) ..................................... P2000-215658

(51) Int. Cl.$^7$ ............................ B21K 1/40; B21D 53/10
(52) U.S. Cl. ............................ 29/898.062; 29/898.07; 29/894.361; 29/894.362; 301/105.1; 384/544; 384/589
(58) Field of Search ................. 29/898.062, 898.07, 29/894.36, 894.361, 894.362; 301/105.1; 384/537, 543, 544, 585, 589

(56) References Cited

U.S. PATENT DOCUMENTS

| | | | | |
|---|---|---|---|---|
| 5,226,738 A | * | 7/1993 | Valette et al. | ................ 384/513 |
| 5,490,732 A | * | 2/1996 | Hofmann et al. | ............. 384/537 |
| 5,975,765 A | * | 11/1999 | Kawamura | .................... 384/537 |
| 6,113,279 A | * | 9/2000 | Sawai et al. | ................. 384/537 |
| 6,135,571 A | * | 10/2000 | Mizukoshi et al. | ........ 301/105.1 |
| 6,398,419 B1 | * | 6/2002 | Kashiwagi et al. | .......... 384/537 |
| 6,524,011 B1 | * | 2/2003 | Miyazaki et al. | ............ 384/544 |
| 6,619,852 B1 | * | 9/2003 | Toda et al. | .................. 384/537 |
| 6,672,769 B1 | * | 1/2004 | Toda et al. | .................. 384/544 |
| 6,772,615 B1 | * | 8/2004 | Hagiwara et al. | ............... 72/67 |
| 6,782,622 B1 | * | 8/2004 | Hagiwara et al. | ....... 29/894.362 |
| 2003/0002761 A1 | * | 1/2003 | Hagiwara | .................... 384/537 |
| 2003/0074793 A1 | * | 4/2003 | Toda et al. | .............. 29/898.07 |

* cited by examiner

Primary Examiner—Eric Compton
(74) Attorney, Agent, or Firm—Jordan and Hamburg LLP

(57) ABSTRACT

A bearing is mounted on a hollow shaft of a hub wheel. A shaft end of the hollow shaft is deformed radially outward and caulked to an outer end face of an inner ring of the bearing. Between a first area in which a spline portion is formed and a second area in which a caulked portion is formed, between a bending starting point for bending the shaft end radially outward and an end face of the shaft end on an inner peripheral face of the hollow shaft, a third area for suppressing deformation of the inner peripheral face of the hollow shaft caused by the caulking is formed. The third area cushions deformation in the first area.

2 Claims, 4 Drawing Sheets

METHOD FOR FORMING A BEARING APPARATUS

This is a Divisional of application Ser. No. 09/902,230 filed Jul. 10, 2001, now abandoned.

BACKGROUND OF THE INVENTION

The present invention relates to a bearing apparatus such as a vehicle hub unit in which a rolling bearing is mounted to a shaft body.

A rolling bearing is mounted to an outer periphery of a shaft body of a hub wheel of a vehicle. A shaft end of the shaft body is bulged and deformed radially outward by rolling caulking, i.e., swaging, to be a caulked portion. This caulked portion is caulked to an outer end face of an inner ring of the bearing to thereby apply a pre-load to the bearing and to fix the bearing to the shaft body.

The shaft body of the hub wheel has a hollow structure such that a drive shaft can be inserted into the shaft body. For spline fitting with the drive shaft, an inner periphery of the shaft body has spline portions.

The spline portions are formed to be substantially adjacent to the caulked portion of the shaft end and to be formed long in an axial direction so as to mechanically connect the inner periphery of the shaft body and the drive shaft with necessary strength.

During installation of the bearing, the spline portions are liable to be deformed radially inward to such a degree as to obstruct insertion of the drive shaft into the shaft body by force applied radially outward to the shaft end during swaging the caulked portion.

SUMMARY OF THE INVENTION

It is a main object of the present invention to provide a bearing apparatus in which a spline portion of an inner periphery of a shaft body is less liable to be deformed by caulking and high accuracy of the spline portion in the shaft body can be maintained.

Other objects, features, and advantages of the invention will become clear by the following description.

To put it briefly, the bearing apparatus of the invention includes a hollow shaft body and a rolling bearing mounted to an outer peripheral face of the shaft body. A shaft end of the shaft body is deformed radially outward and caulked to an outer end face of an inner ring of the rolling bearing. The shaft body has on an inner peripheral face thereof a first area in which a spline portion in an axial direction is formed, a second area between a bending starting point for bending the shaft end of the shaft body radially outward and an end face of the shaft body, and a third area between the first area and the second area for suppressing deformation of the inner peripheral face of the shaft body by the caulking.

According to the invention, even if the spline portion is formed to be axially long on the inner periphery of the hollow shaft body so as to be mechanically connected to a spline portion on an outer periphery of a drive shaft, because the third area is provided between the first area and the second area, the first area does not directly receive an influence of radially outward deformation of the shaft end caused by caulking. As a result, it is possible to maintain high accuracy of the spline portion and the first area is not deformed to such a degree as to obstruct insertion of the drive shaft.

In the invention, the third area is preferably set according to the following expression (1):

$$(X1/X2) > (y1/y2) \tag{1}$$

where

X1 is an axial distance from a position of a caulking side end portion of the first area to the bending starting point for bending the shaft end of the shaft body radially outward, X2 is an axial distance from the bending starting point to a caulking side outer end face of the inner ring, y1 is a difference between an outside diameter and a pitch diameter of the first area, and y2 is a difference between an outside diameter and an inside diameter of the shaft end of the shaft body.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF PREFERRED EMBODIMENTS

Figure 1:
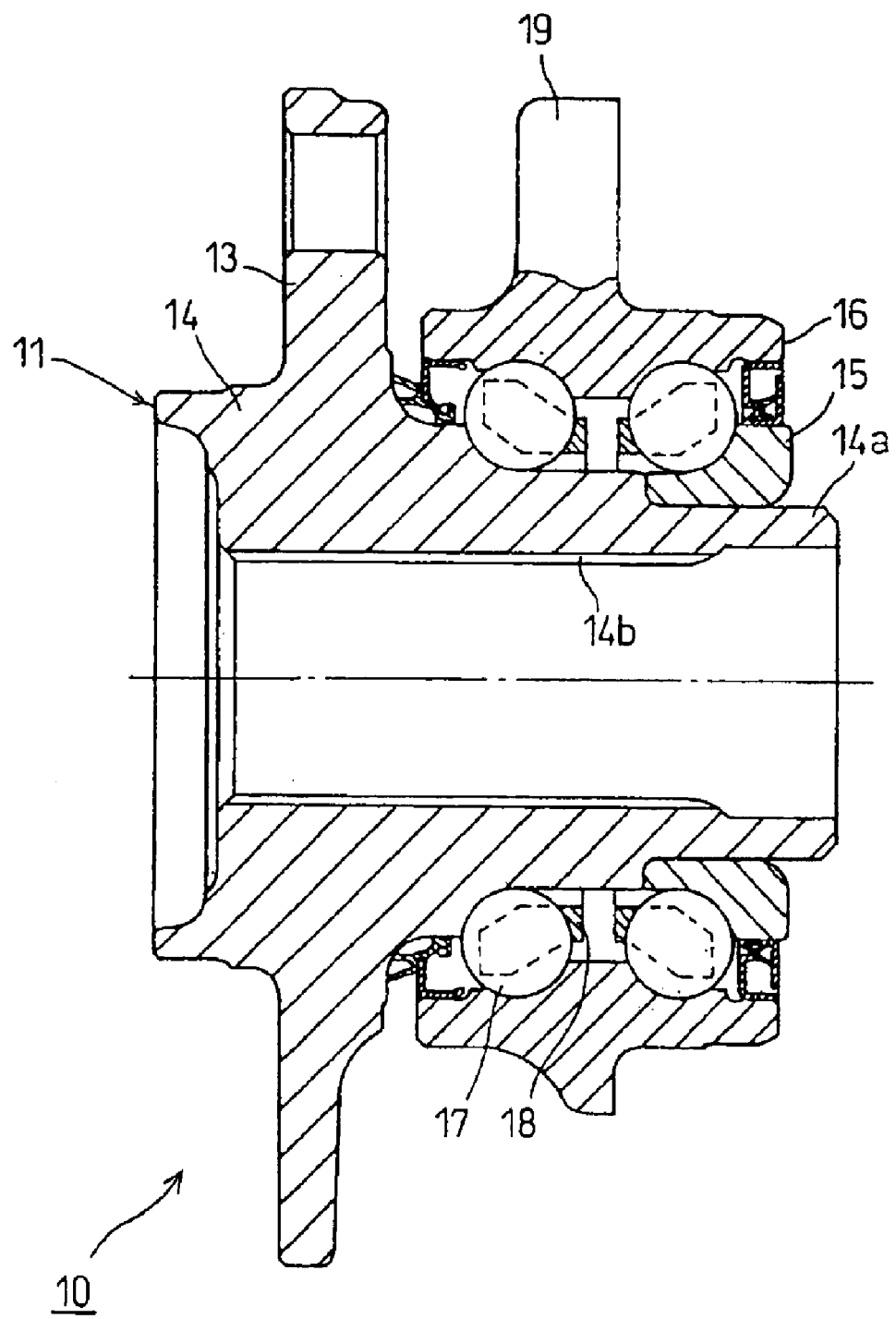
FIG. 1 is a vertical sectional view of a hub unit according to the preferred embodiment of the present invention in a state before a hollow shaft of a hub wheel is caulked.

A preferred embodiment of the present invention is described below with reference to FIGS. 1 to 5. A vehicle hub unit is taken as an example of a bearing apparatus. However, balls and the like are not shown in FIG. 5 for ease of illustration.

The hub unit 10 includes a hub wheel 11 and a bearing 12. The bearing 12 is a double row angular contact ball bearing with vertices of contact angles outside of the bearing and is an example of a rolling bearing of a diagonal contact type.

The hub wheel 11 includes a flange 13 which is in a radially outward orientation and to which a wheel (not shown) is mounted and a hollow shaft 14.

The bearing 12 includes one inner ring 15 fitted over a small-diameter outer peripheral face of the hollow shaft 14 and having a single race, a single outer ring 16 having two rows of races, a plurality of balls 17 disposed in two rows, and two snap cages 18. As the inner ring 15, an inner ring of a general single row angular contact ball bearing is used as it is.

In the bearing 12, a large-diameter outer peripheral face of the hollow shaft 14 is used as another inner ring.

The flange 19 is provided to an outer periphery of the outer ring 16 in the radially outward orientation.

Figure 2:
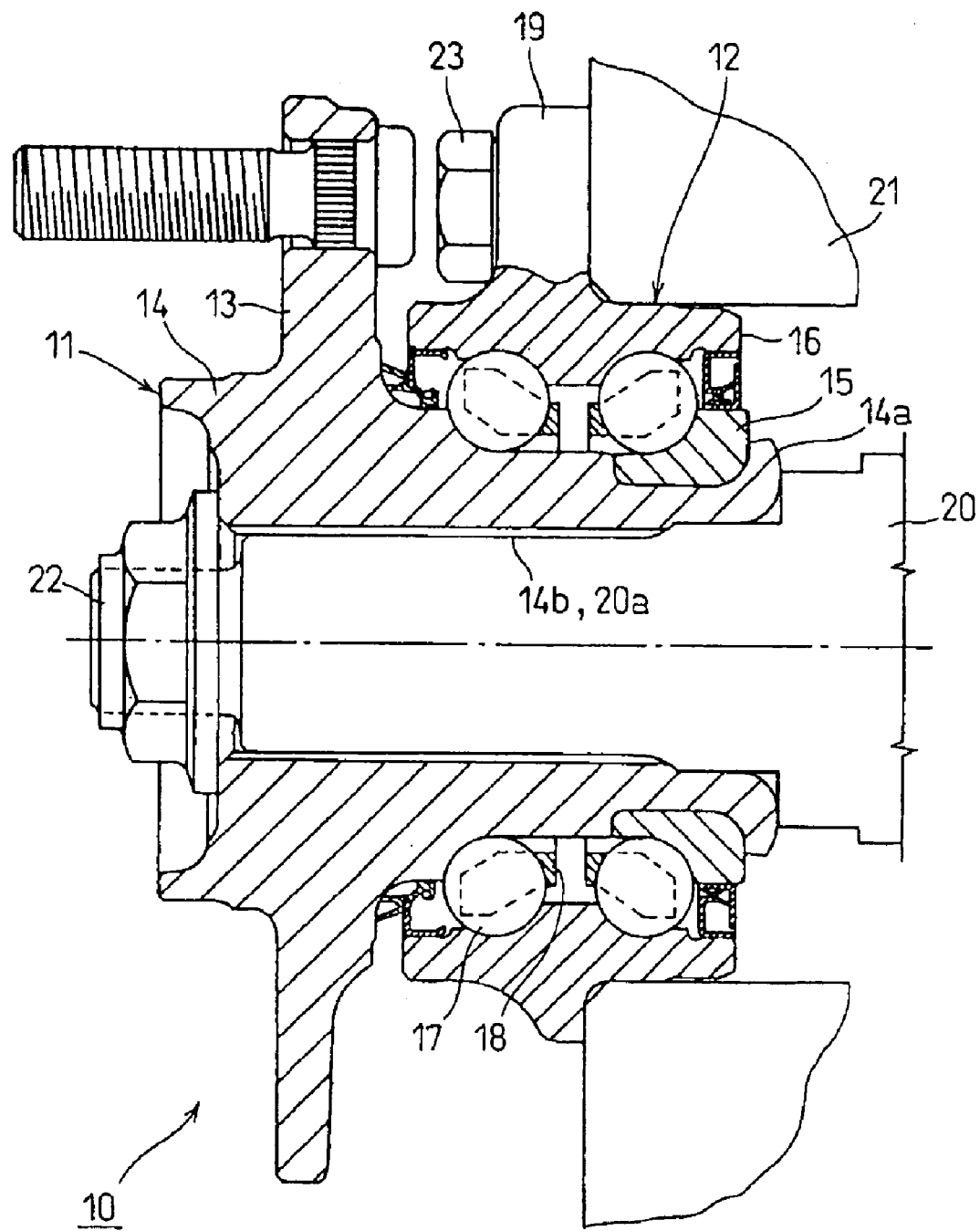
FIG. 2 is a vertical side sectional view of the hub unit according to the preferred embodiment of the invention in a state after the hollow shaft of the hub wheel is caulked.

A shaft end 14a of the hollow shaft 14 is caulked to a caulking side outer end face of the inner ring 15 from the state in FIG. 1 to the state in FIG. 2. As a result of this caulking, the shaft end 14a becomes a caulked portion.

In a caulked state in FIG. 2, the hub unit 10 is mounted between a drive shaft 20 and a shaft case 21 of a vehicle.

In other words, the hollow shaft 14 of the hub wheel 11 is spline-fitted over the drive shaft 20 and connected to the drive shaft 20 through a nut 22. The flange 19 of the outer ring 16 of the bearing 12 is connected to the shaft case 21 through a bolt 23 so as not to rotate.

A spline portion 14b is formed on an inner periphery of the hollow shaft 14 and another spline portion 20a is formed on an outer periphery of the drive shaft 20. Through both the spline portions 14b and 20a, the spline fitting is carried out.

Figure 3:
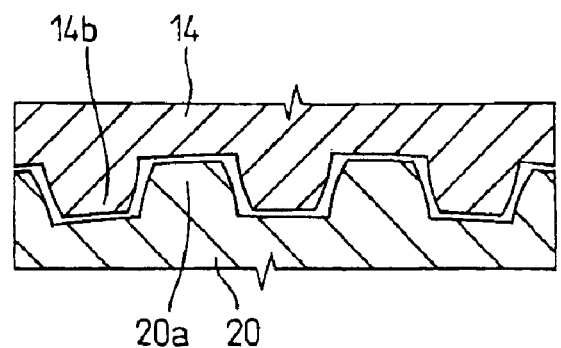
FIG. 3 is an enlarged sectional view of spline-fitted portions of an inner periphery of a shaft body of the hub wheel and an outer periphery of a drive shaft in the hub unit.
Figure 4:
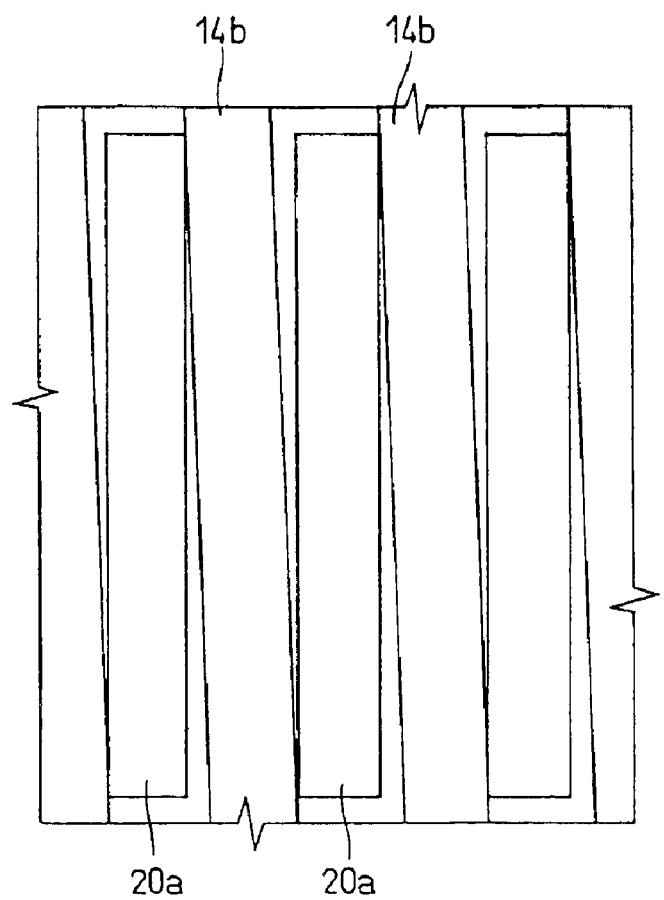
FIG. 4 is an enlarged plan view of spline-fitted portions of the inner periphery of the shaft body of the hub wheel and the outer periphery of the drive shaft in the hub unit.

A fitted state of the spline portions 14b of the hollow shaft 14 and the spline portions 20a of the drive shaft 20 is as shown in FIGS. 3 and 4. In other words, the respective spline portions 14b and 20a are spaced uniformly in circumferential directions and are in involute shapes. In this case, shapes of both the spline portions 14b and 20a are not limited to the involute shapes but may be other shapes.

The spline portions 14b of the hollow shaft 14 are inclined in the circumferential direction. First sides of the spline portions 14b in the circumferential direction are in contact with first sides of the spline portions 20a of the drive shaft 14 in the circumferential direction while the second sides of the spline portions 14b in the circumferential direction are in contact with the second sides of the spline portions 20a in the circumferential direction.

Figure 5:
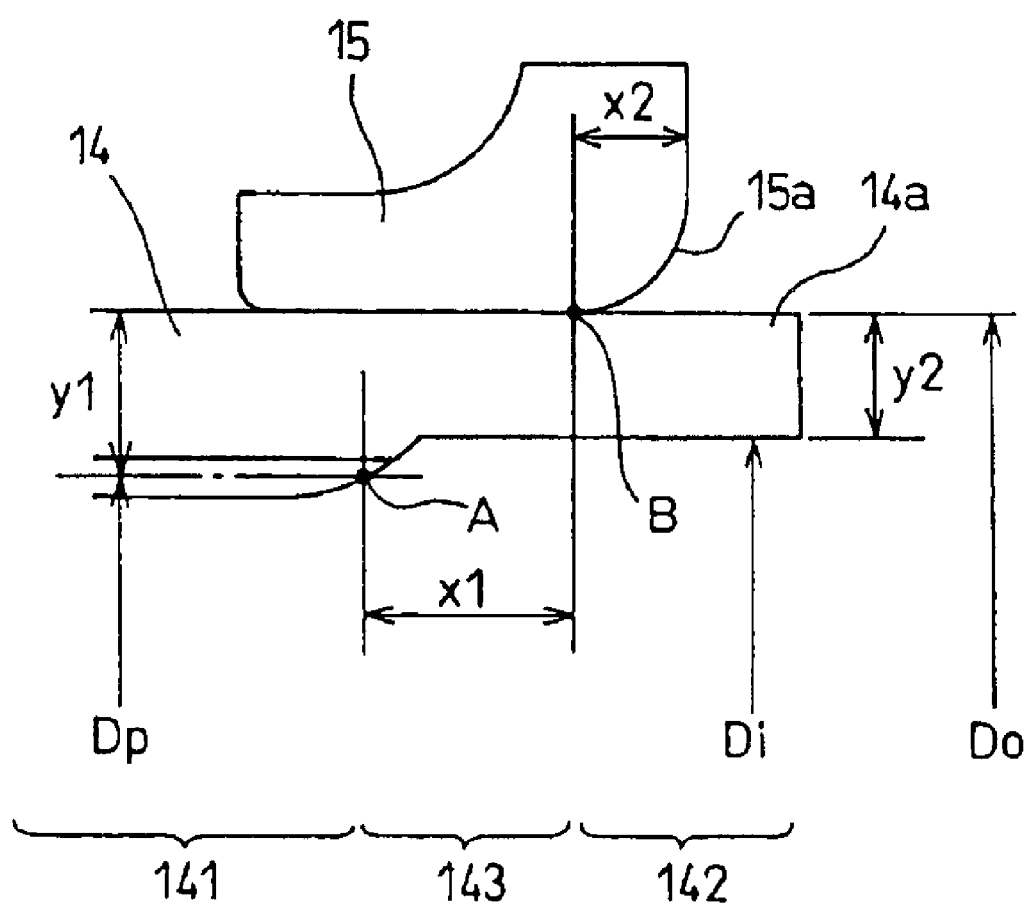
FIG. 5 is an enlarged sectional view of a periphery of an inner ring of a bearing and a shaft end of the hollow shaft in the hub unit.

Referring to FIG. 5, in the hollow shaft 14, a spline portion forming area (first area) 141 includes the spline portions 14b and a caulked portion forming area (second area) 142 includes the caulked portion 14a.

Between the first and second areas 141 and 142, a cushioning area (third area) 143 for suppressing deformation of the inner peripheral face of the hollow shaft 14 caused by caulking of the shaft end 14a of the hollow shaft 14 is provided.

Therefore, influence of caulking of the shaft end 14a of the hollow shaft 14 on the first area 141 is cushioned by the third area 143. As a result, deformation of the first area 141 due to the caulking is alleviated or suppressed.

Thus, high accuracy of the spline portions 14b in the first area 141 can be maintained even after the caulking and such a degree of deformation of the spline portions 14b as to obstruct insertion of the drive shaft 20 can be prevented.

The first area 141 is an area between axially opposite end faces of the spline portions 14b formed on the inner periphery of the hollow shaft 14 and a caulking side end face on a pitch circle line of the spline portion 14b is defined as a caulking side end portion A of the first area 141.

The second area 142 is an area from a bending starting point B of the shaft end 14a of the hollow shaft 14 to an end face of the shaft end 14a. An inner peripheral edge portion 15a of a caulking side outer end face of the inner ring 15 is chamfered round, e.g., with a quarter of a circumference of a radius of curvature X2 from a center O. A point of intersection of a radial line from the center O and the inner peripheral edge portion 15a is defined as the bending starting point B.

The third area 143 is an area between the caulking side end portion A and the bending starting point B.

If a difference between an outside diameter Do of the hollow shaft 14 and a pitch diameter Dp of the spline portion 14b is y1, a difference between the outside diameter Do and an inside diameter Di of the hollow shaft 14 is y2, an axial distance (corresponding to an axial length of the third area 143) from the caulking side end portion A of the spline portion 20b to the bending starting point B is X1, and an axial distance from the bending starting point B to the caulking side outer end face of the inner ring 15 is X2, a position of the third area 143 is set according to the following expression (1).

$$(X1/X2) > (y1/y2) \quad (1)$$

Setting the position of the third area 143 by using the above expression (1) is preferable because production of the hollow shaft 14, i.e., settings of positions in which the spline portions are formed and the shaft end which will be the caulked portion and the like are easy.

A ground for the above expression (1) will be described. The following expression (2) is obtained by transforming the expression (1).

$$X1 > X2(y1/y2) \quad (2)$$

Here, X2 is the axial distance from the bending starting point B to the caulking side outer end face of the inner ring 15. This is based on setting the axial length X1 of the third area 143 at a large value because the influence of deformation in caulking the shaft end 14a of the hollow shaft 14 on the first area 141 becomes large when the radius of curvature of chamfering of the inner peripheral edge portion 15a of the inner ring 15 becomes large or when a ratio between y2 and y1, i.e., a ratio between wall thicknesses of the first and second areas 141 and 142 becomes large.

The invention can be similarly applied to a vehicle hub unit having a hollow shaft with a bottom in an axial direction. The invention can be similarly applied to a vehicle hub unit for a vehicle follower wheel.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A method for forming a bearing apparatus comprising:
   providing a roller bearing having an inner ring with an inner circumferential surface, an inner ring radial end surface, and a chamfered corner having a chamfer radius X2 and extending from an inner circumferential surface end point to said inner ring radial end surface;
   providing a hollow shaft body having:
   a shaft end;
   an internal splined portion having a spline pitch diameter y1 and extending to toward said shaft end to a spline portion end point; and
   a spline free portion having a thickness y2 extending from said spline portion end point to said shaft end;
   calculating a distance X1>X2(y1/y2);
   positioning said inner ring on said hollow shaft such that said inner circumferential surface end point is distanced from said spline portion end point toward said shaft end by the distance X1; and
   swaging said hollow shaft outward from a bending starting point aligned with said inner circumferential surface end point to said shaft end to fix said inner ring.

2. The method according to claim 1, wherein said roller bearing is a double row angular contact ball bearing with vertices of contact angles outside of the roller bearing.

* * * * *